(12) United States Patent
Chetlur et al.

(10) Patent No.: US 9,281,960 B2
(45) Date of Patent: *Mar. 8, 2016

(54) ESTIMATING PROCESSING WORKLOADS

(75) Inventors: Malolan Chetlur, Bangalore (IN); Umamaheswari C. Devi, Bangalore (IN); Parul Gupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/596,870

(22) Filed: Aug. 28, 2012

(65) Prior Publication Data

US 2012/0327887 A1 Dec. 27, 2012

Related U.S. Application Data

(63) Continuation of application No. 12/945,007, filed on Nov. 12, 2010.

(51) Int. Cl.
| | |
|---|---|
| *H04L 12/54* | (2013.01) |
| *H04W 28/08* | (2009.01) |
| *H04W 72/12* | (2009.01) |
| *H04W 84/04* | (2009.01) |
| *H04W 88/08* | (2009.01) |

(52) U.S. Cl.
CPC .......... *H04L 12/5692* (2013.01); *H04W 28/08* (2013.01); *H04W 72/12* (2013.01); *H04W 84/045* (2013.01); *H04W 88/08* (2013.01)

(58) Field of Classification Search
CPC ..... H04W 24/00; H04W 28/08; H04W 72/12; H04W 84/045; H04W 88/08; H04L 43/0852; H04L 43/50; H04L 43/08; H04L 12/5692; H04B 17/003

USPC .......................................................... 370/252
See application file for complete search history.

(56) References Cited

U.S. PATENT DOCUMENTS

| | | | |
|---|---|---|---|
| 6,286,104 B1 | 9/2001 | Buhle et al. | |
| 7,173,904 B1 * | 2/2007 | Kim ............................. | 370/230 |
| 7,477,902 B2 * | 1/2009 | Clark et al. .................... | 455/453 |
| 2003/0007470 A1 * | 1/2003 | Grilli et al. .................... | 370/335 |
| 2004/0203694 A1 | 10/2004 | Wong et al. | |
| 2008/0130794 A1 * | 6/2008 | Chong et al. .................. | 375/317 |
| 2009/0293060 A1 * | 11/2009 | Guevorkian et al. .......... | 718/102 |
| 2009/0323604 A1 | 12/2009 | DeJaeger et al. | |
| 2010/0295731 A1 | 11/2010 | Chong et al. | |

FOREIGN PATENT DOCUMENTS

WO 2008000905 3/2008

OTHER PUBLICATIONS

Ulversoy, T et al., "On Workload in an SCA-Based System, with Varying Component and Data Packet Sizes", RTO Information Systems Technology Panel (IST) Symposium, Prague, Czech Republic, Apr. 21-22, 2008.

*Primary Examiner* — Christopher Grey

* cited by examiner (74) *Attorney, Agent, or Firm* — Ference & Associates LLC (57) ABSTRACT

Systems and associated methods for estimating wireless workloads are described herein. Systems and methods provide for generating an estimate of a wireless workload's processing requirements from the combined knowledge of system specific values, such as system parameters, platform details, and implementation details. Systems and methods for estimating wireless workloads may be utilized in various wireless protocols, including, 3G, WiMax, LTE, WiFi, femtocells, and point-to-point wireless links. The estimated workloads may be used for scheduling wireless workloads in a shared computing environment.

13 Claims, 6 Drawing Sheets

ESTIMATING PROCESSING WORKLOADS

CROSS REFERENCE TO RELATED APPLICATION

This application is a continuation of U.S. patent application Ser. No. 12/945,007, entitled SYSTEMS AND METHODS FOR ESTIMATING PROCESSING WORKLOADS, filed on Nov. 12, 2010, which is incorporated by reference in its entirety.

BACKGROUND

Software Defined Radio (SDR) is a paradigm where wireless protocol processing happens on a programmable platform instead of on an application specific integrated circuit (ASIC). SDR has many advantages, including cost savings, flexibility, and speed and ease of development. In addition, SDR enables resource sharing for certain wireless protocol processing that is not available under existing technology. This resource sharing allows for multiple wireless standards and multiple service providers to perform wireless processing on a shared computing platform. As such, SDR allows wireless providers to take advantage of the benefits of shared computing, such as those achieved through cloud computing. However, wireless workloads have high computational and stringent real-time requirements which must be followed in a shared computing environment.

BRIEF SUMMARY

Systems and associated methods for estimating wireless workloads are described herein. Systems and methods provide for generating an estimate of a wireless workload's processing requirements from the combined knowledge of system specific values. Embodiments provide for dynamically generating estimates of wireless workloads based on system specific values including, but not limited to, system parameters, platform details, and implementation details. According to embodiments, methods for estimating wireless workloads may be utilized in various wireless protocols, including, but not limited to, 3G, WiMax, LTE, WiFi, femto-cells, and point-to-point wireless links.

In summary, one aspect provides a method comprising: accessing at least one wireless workload produced on at least one wireless base station; generating at least one requirements estimate of the at least one wireless workload; providing the at least one requirements estimate to at least one system function; wherein the at least one system function operates to manage processing of the at least one wireless workload.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment (s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The description now turns to the figures. The illustrated example embodiments will be best understood by reference to the figures. The following description is intended only by way of example and simply illustrates certain example embodiments representative of the invention, as claimed.

Relatively recent technological advances, such as SDR, have provided for the ability to process wireless workloads in software, such as a shared computing environment. As a non-limiting example, cloud computing will be utilized as an example of a shared computing environment. Traditionally, such processing was done locally in dedicated and proprietary hardware for wireless base stations, including cell phone towers and WiMax base stations. As such, unique computing clouds arise that are processing wireless workloads exclusively or in addition to typical IT applications. For example, a particular wireless workload may involve receiving and digitizing a received wireless signal, then running the proper algorithms to process the resultant data. In addition to typical cloud computing processes, wireless processes are required that have a shared architecture. These developments allow for the movement of applications and processing from the wireless base stations out to a cloud computing environment, essentially creating wireless computing clouds.

Wireless workloads, and therefore wireless clouds, require heavy processing that must be carried out in a very short time frame. Depending upon the platform, this range of this time frame could vary from several microseconds to just a few milliseconds. As such, workload calculation is important. Accurate workload estimation is needed for cloud processes including, but not limited to, implementing a scheduling policy, determining processing resource requirements, and admission control. If the workload estimation is not accurate, cloud functions such as process scheduling will not occur properly.

Existing technology has attempted to address workload estimation, including workload estimation for IT applications in shared grid and cloud-based systems, and Worst Case Execution Time (WCET) estimation for real-time systems such as embedded systems like avionic systems, command and control systems, and multimedia systems. However, this existing technology is not directed to the unique characteristics and challenges of dynamic wireless workloads. For example, certain existing algorithms are offline, wherein the estimation computation is done before the system is running such that a static value is used. Because of the dynamism of wireless workloads, wireless clouds need to have an online algorithm that provides estimates as the packets are arriving and changing and be able to update accordingly. On the other hand, existing adaptive schemes need time to converge, leading to inaccurate estimates and possible packet losses during initial iterations. As such, they are also not suitable for the rapidly changing wireless workloads.

Embodiments provide for estimating wireless workloads applicable across various wireless platforms including, but not limited to, wide area networks such as 3G, WiMax and LTE, local area networks, WiFi, femtocells, and point-to-point wireless links. The computation for one transmission unit, for example one OFDMA frame in WiMax (which includes scheduling, packing, and encryption in MAC, and scrambling, interleaving, coding, and modulation in PHY), depends on several system-specific values. As a non-limiting example, system specific values may include: number of users and flows, and their QoS parameters; total bytes packed in the unit; and number of symbols/slots processed and the Modulation Coding Schemes (MCS) used for each. Wireless networks have control plane methods through which several system parameters are known beforehand. Such system parameters, include, but are not limited to number of users, flows and QoS parameters. The remaining parameters are computed by an intelligent module per transmission unit or, as referred to hereafter, the Scheduler Engine. Non-limiting examples of the remaining parameters include number of bursts, MCS, total bytes, and symbols. Embodiments provide that the combined knowledge of all these parameters can be used to obtain a coarse estimate of the wireless workload-intensity at the beginning of a frame. In addition, embodiments provide that after the Scheduler Engine, the workload can be calculated exactly for a particular implementation and platform.

Figure 1:
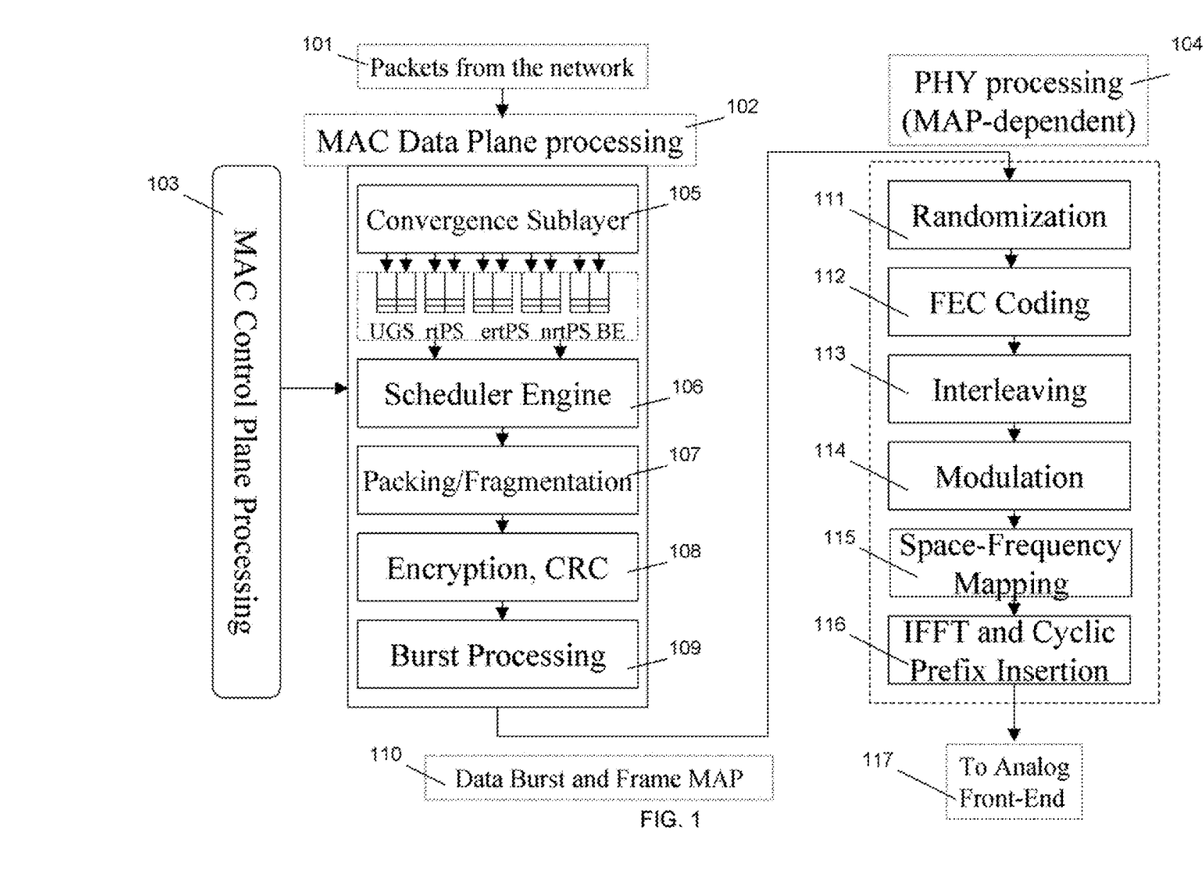
FIG. 1 illustrates an example of MAC and PHY processing on a WiMax base station.

Referring now to FIG. 1, therein is depicted a non-limiting illustration of MAC and PHY processing on a WiMax base station in the downlink direction. Packets from the network 101 enter MAC Data Plane Processing 102. The packets 101 follow the path through MAC Data Plane Processing 102 that includes a convergence sublayer 105, scheduler engine 106, packing/fragmentation 107, encryption and CRC 108, and burst processing 109. In addition, MAC Control Plane Processing 103 interfaces with MAC Data Plane Processing 102. Data burst and frame MAP 110 then enters MAP-dependant PHY processing 104. Proceeding through the MAP-dependent PHY processing 104 includes randomization 111, FEC coding 112, interleaving 113, modulation 114, space-frequency mapping 115, and IFFT and cyclic prefix insertion 116. After MAP-dependant PHY processing, the data may proceed to an analog front-end 117.

Figure 2:
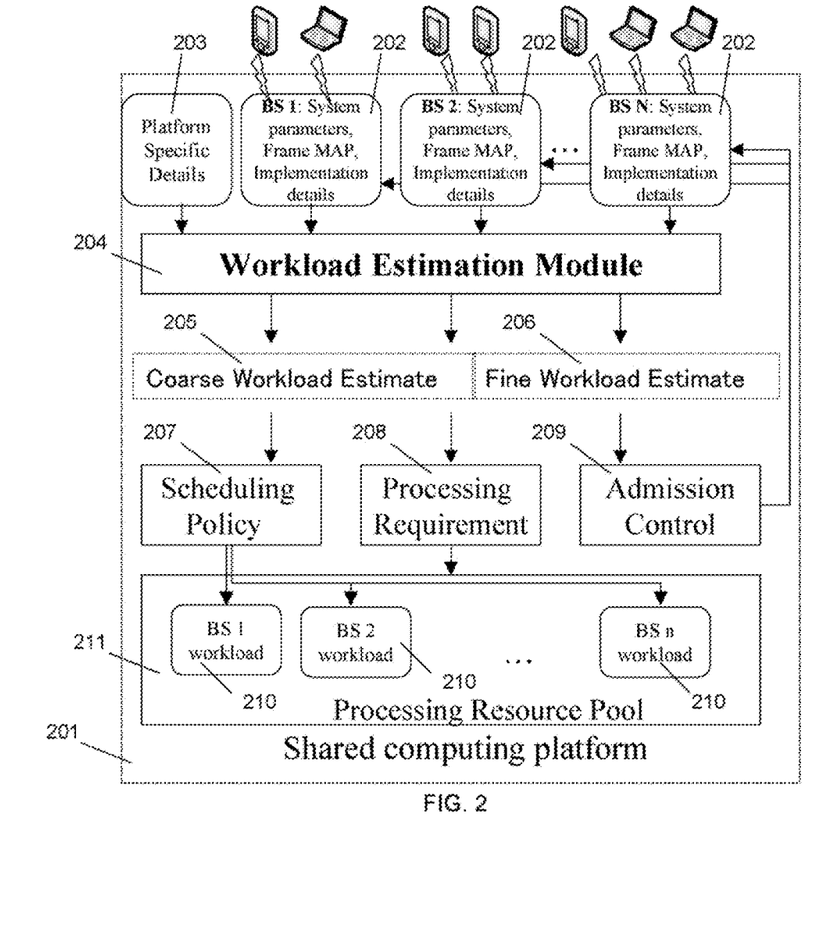
FIG. 2 illustrates an example embodiment.

Referring now to FIG. 2, therein is illustrated an embodiment within a shared computing environment 201. A set of base stations 202 operatively communicate with wireless devices 201. According to embodiments, each base station 202 may be running a different wireless standard. Non-limiting examples of different wireless standards include GSM, WiMax or LTE. As depicted in FIG. 2, each base station 202 has its own set of information, including, but not limited to, system parameters, frame MAP, and implementation details. The information for each base station 202 and the platform specific details 203 are fed into the workload estimation module 204. Embodiments provide that each type of wireless standard would have its own specific workload estimation module 204. A coarse estimation 205 and a fine estimation 206 would be produced by the workload estimation module 204. In addition, embodiments provide that just a coarse estimation 205 or just a fine estimation 206 may be produced. One or both of the coarse estimate 205 and fine estimate 206 may be used by scheduling policy 207, processing requirement determination 208, and admission control 209 functions. Scheduling policy 207 may use one or both of the coarse estimate 205 and fine estimate 206 to schedule base station workloads 210 in the processing resource pool 211. Processing requirement determination function 208 may use one or both of the coarse estimate 205 and fine estimate 206 to determine whether processing resources need to be added or may be removed from the processing resources pool 211 for serving the requirements of the set of BS workloads 210. Admission control 209 may utilize one or both of the coarse estimate 205 and fine estimate 206 to determine whether to admit or deny processing requests.

A coarse workload computation formula for a WiMax base station now serves as a non-limiting example of an embodiment. The coarse workload computation formula for the WiMax example embodiment is:

$$W_{SCH} = N_{users} \times (C_{AMC} + C_{MM}) + \sum_{j=1}^{N_{type}} N_{CID}(j) C_{SCH}(j)$$

In this embodiment, the example formula elements are: $W_{SCH}$ is the coarse estimate of the workload of the Scheduler Engine; $N_{users}$ is the number of users; $C_{AMC}$ and $C_{MM}$ are the known implementation-dependent complexities of the Adaptive Modulation and Coding (AMC) and the MAC Management module (MM) per user; $N_{type}$ is the number of supported flow types, for example, in Wimax five types are supported (UGS, rtPS, nrtPS, ertPS and BE); $N_{CID}(j)$ is the number of CIDs of type j registered with the Base Station; $C_{SCH}(j)$ is the implementation-dependent complexities of the packet scheduler and resource allocation module for flows of type j.

Embodiments provide that the coarse estimate of CPS (except Scheduler Engine) and PHY latencies can be obtained by using estimates, instead of actual values in the transmission unit, of certain parameters. Non-limiting examples of the estimated values include number of symbols, slots, total bytes based on the frame capacity for the most robust modulation and total outstanding queue. In addition, Implementation-Dependent Complexity (IDC) is the number of cycles/time consumed by the specific implementation of an operation under consideration on a specific hardware platform. IDC can be provided for multiple hardware platforms on which the wireless processes may be instantiated, including, but not limited to, a cloud environment, if needed.

A fine workload computation formula for a WiMax base station now serves as another non-limiting example of an embodiment. After scheduler engine processing completes, the embodiment uses frame MAP as prepared by the scheduler engine. The formula for calculating the workload of the MAC CPS is:

$$W_{CPS} = (C_{ENC} + C_{CRC} + C_{MC}) + \sum_{k=1}^{N_{burst}} N_{dB}(k) + C_{GMH}N_{pdu} + C_{SH}N_{SH}$$

In this embodiment, the elements of the formula for calculating the workload of the MAC CPS are: $W_{CPS}$ is the MAC CPS workload estimate; $C_{ENC}$, $C_{CRC}$, $C_{MC}$, $C_{GMH}$, $C_{SH}$ are the known implementation dependent complexities of the encryption, CRC computation, memory copy, GMH calculation, and subheader computation operations respectively; and $N_{burst}$, $N_{pdu}$, $N_{SH}$, $N_{db}(k)$ are the number of bursts, pdus, subheaders and data bytes for burst k in the frame.

The physical layer (PHY) workload formula is:

$$W_{PHY} = C_{byte}\sum_{k=1}^{N_{burst}} S(k)MCS(k) + \sum_{k=1}^{N_{burst}} S(k)C_{sym}(k) + C_{slot}\sum_{k=1}^{N_{burst}} S(k) + N_{sym}C_{FFT}$$

In this embodiment, the elements of the formula for calculating the PHY workload are: $W_{PHY}$ is the physical layer processing workload estimate; $C_{byte}$, $C_{slot}$ and $C_{FFT}$ are the known complexities of bytes level, slot level and FFT operations; S(k) is the number of slots in burst k; MCS(k) is the MCS assigned for burst k and $C_{sym}(k)$ is the implementation dependent complexity of symbol level operations for burst k.

Figure 3:
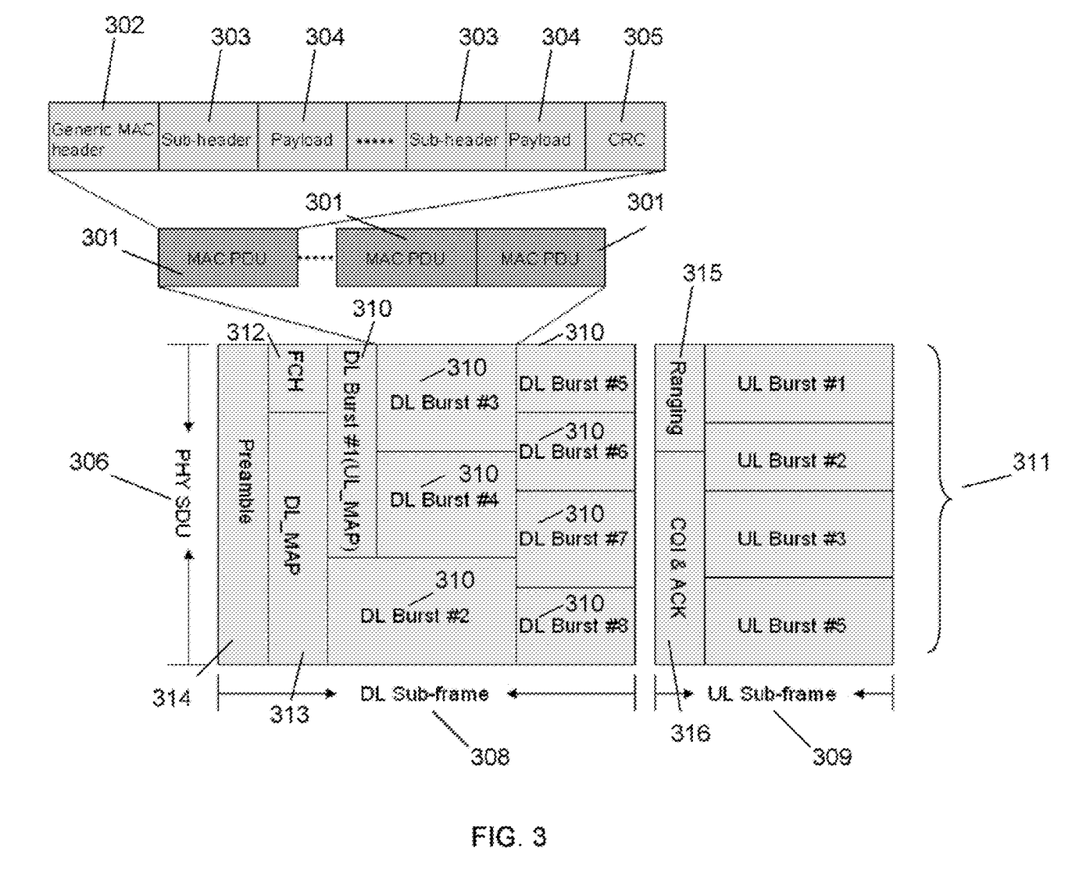
FIG. 3 illustrates an example of a frame map built by a scheduler engine.

Referring now to FIG. 3, therein is depicted a non-limiting example of a frame map built by a WiMax scheduler engine. Media Access Control Packet Data Units (MAC PDU) 301 are comprised of, among other things, a generic MAC header 302, sub-headers 303, payloads 304, and error checking bits (CRC) 305. MAC PDUs are transmitted in PHY DL bursts 310 or UL bursts 311 within a PHY SDU 306. The PHY SDU 306 is comprised of, among other things, a DL sub-frame 308 and a UL sub-frame 309. The DL sub-frame 308 is further comprised of DL bursts 310, FCH 312, DL_MAP 313, and a preamble 314. The UL sub-frame 309 is comprised of UL bursts 311, ranging 315, and CQI & ACK 316.

Figure 4:
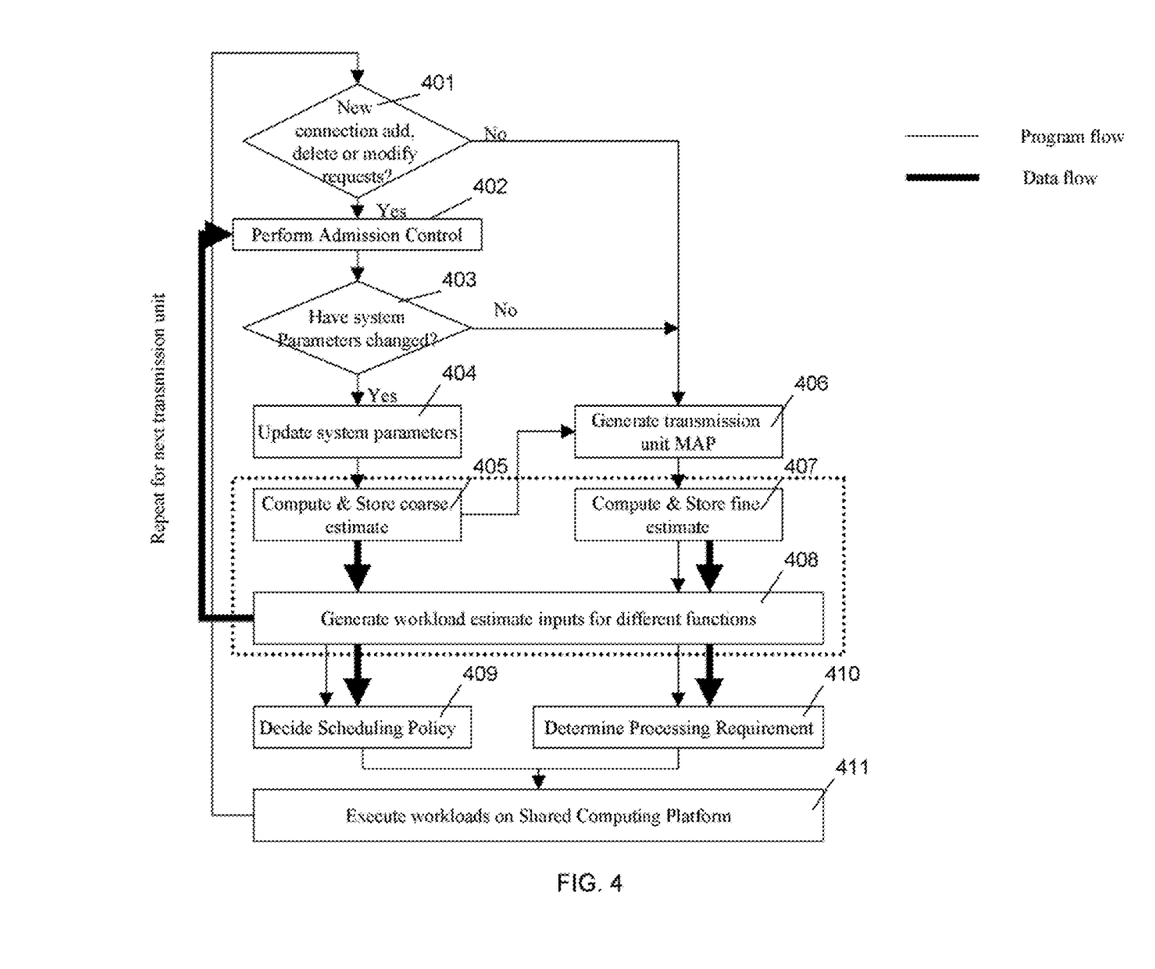
FIG. 4 illustrates an example embodiment.

Referring now to FIG. 4, therein is depicted a flowchart illustrating an embodiment. When a system request 401 occurs, the Admission Control function 402 determines whether the system can handle the system request. System requests include, but are not limited to, adding or deleting connections, or modifying connection parameters. The Admission Control function 402 determines whether the the incoming requests may be honored or declined based on criteria including, but not limited to, the cumulative workload due to the new requests and sessions (connections) in progress, and the available processing capacity. A non-limiting example of a connection involves a wireless computing device connecting to a wireless base station. To help with such admission control and other functionalities (described below), system parameters are continuously monitored and it is determined whether system parameters have changed 403. If the parameters have changed, then they are updated 404 and a coarse estimate is computed and stored 405. After the coarse estimate has been computed 405 or if the system parameters have not changed 403, a transmission unit map is generated 406. As depicted in FIG. 4, embodiments provide that after the transmission unit map is generated, a fine estimate is computed and stored 407. Following the generation of the coarse estimate 405 or the fine estimate 407, workload estimate inputs for the different system functions are generated 408. As shown in FIG. 4, system functions utilizing the coarse estimate 405 or fine estimate 407 include decide scheduling policy 409, determine processing requirement 410, and admission control 402 functions. The decide scheduling policy 409 and determine processing requirement 410 functions are utilized to execute the workloads on the shared computing platform 411. The embodiment illustrated in FIG. 4 may be repeated for the next transmission unit or, alternatively, less frequently than every transmission unit if desired.

Figure 5:
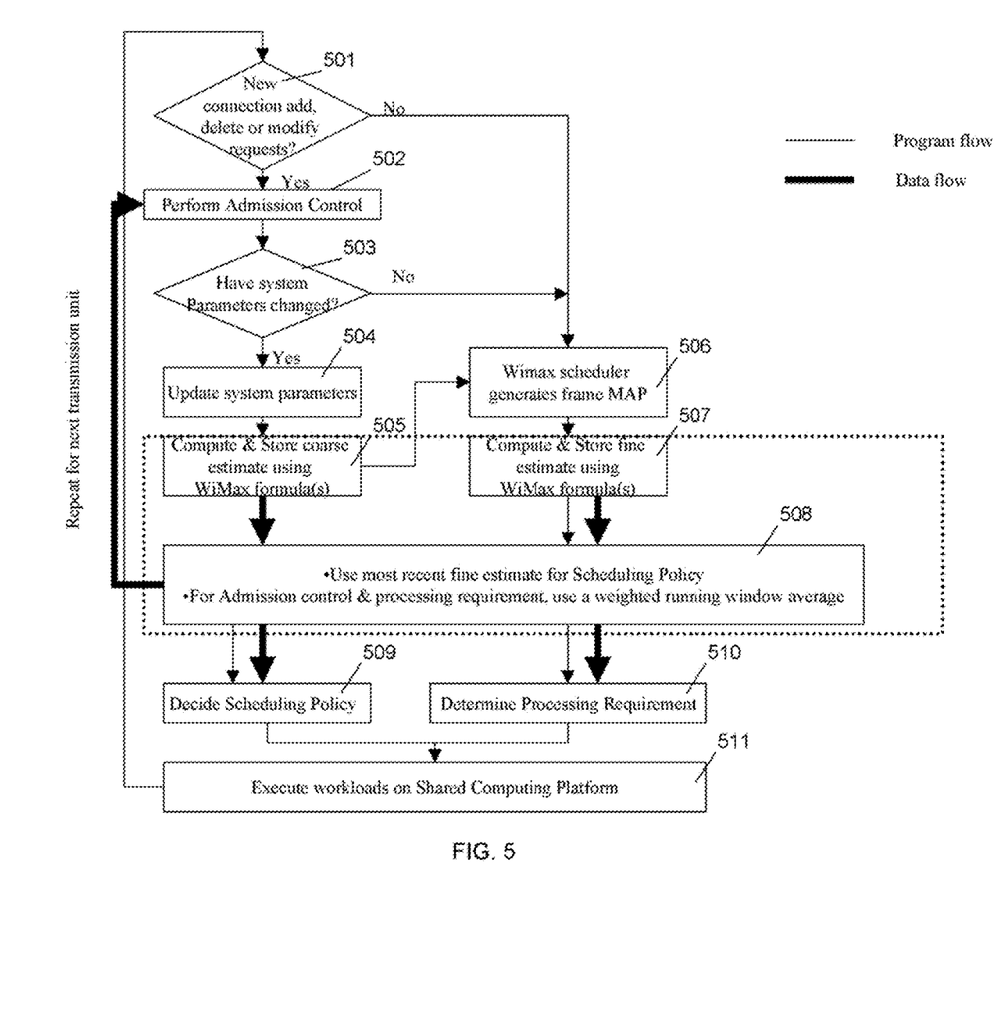
FIG. 5 illustrates an example of workload estimation of a WiMax base station.

Referring now to FIG. 5, therein is depicted a flowchart of an embodiment involving workload estimation of a WiMax base station.

When a request 501 occurs, the Admission Control function 502 determines whether the shared computing platform can handle the request. According to an embodiment, the Admission Control function 502 involves generating a new set of system parameters upon receiving an add/delete/modify request. These parameters include, but are not limited to, a requested connection parameter in addition to the existing set of parameters for served connections. Embodiments provide that a workload estimate is also computed for this new set of parameters. In addition, certain embodiments provide that if the workload estimate exceeds the current and extensible computation capacity of the shared computing platform, then the request is denied. As a simple and non-limiting example, if a wireless device requests to connect to a wireless base station and the workload estimate indicates whether the request can by adequately handled by the system. If the system cannot handle the new device, the request to connect to the base station is denied.

The embodiment depicted in FIG. 5 then determines whether system parameters have changed 503. If the parameters have changed, then they are updated 504 and a coarse estimate is computed and stored 505. According the WiMax base station embodiment illustrated in FIG. 5, the coarse estimate may be computed according to the WiMax base station formula discussed previously herein:

$$W_{SCH} = N_{users} \times (C_{AMC} + C_{MM}) + \sum_{j=1}^{N_{type}} N_{CID}(j)C_{SCH}(j)$$

After the coarse estimate has been computed 505 or if the system parameters have not changed 503, a transmission unit map is generated 506. As depicted in FIG. 5, embodiments provide that after the transmission unit map is generated, a fine estimate is computed and stored 507. Embodiments provide that the fine estimate may be calculated according to the formulas for calculating the fine estimate previously described herein:

$$W_{CPS} = (C_{ENC} + C_{CRC} + C_{MC}) + \sum_{k=1}^{N_{burst}} N_{dB}(k) + C_{GMH}N_{pdu} + C_{SH}N_{SH}$$

$$W_{PHY} = C_{byte}\sum_{k=1}^{N_{burst}} S(k)MCS(k) + \sum_{k=1}^{N_{burst}} S(k)C_{sym}(k) + C_{slot}\sum_{k=1}^{N_{burst}} S(k) + N_{sym}C_{FFT}$$

Following the generation of the coarse estimate 505 or the fine estimate 507, the embodiment depicted in FIG. 5 utilizes the most recent fine estimate for scheduling policy 509 and a weighted running window average for the admission control 502 and determining processing requirement 510 functions.

Scheduling policy according to the embodiment depicted in FIG. 5 provides that if admission control is aggressive (i.e., not too conservative), then the processing requirements of all of the base stations in a system can exceed the total available processing capacity. In addition, embodiments provide that during such overload periods, a scheduling module may determine the base stations whose frame transmissions may be delayed or frame contents can be lowered to ensure that high priority deadlines are still met.

According to the embodiment illustrated in FIG. 5, determining processing requirements involves adding more processing resources in proportion to a workload increase beyond a certain computing capacity. A non-limiting example of adding more processing resources is to add a new server to a shared computing environment. In addition, embodiments also provide that if the workload falls much below current computation capacity, some processing resources may be removed in proportion to the decrease. The decide scheduling policy 509 and determine processing requirement 510 functions are utilized to execute the workloads on the shared computing platform 511. Aspects of the invention provide that the embodiment illustrated in FIG. 5 may be repeated as necessary.

Embodiments provide a general purpose shared computing platform for wireless workloads. In addition, embodiments provide for a cloud shared computing platform. According to embodiments, wireless workloads are estimated according to parameter modeling. In addition, embodiments utilize either or both of a coarse estimate at the beginning of a frame and a fine estimate after the scheduler engine. As such, embodiments are able to provide an online estimate that is accurate from the very first computation. This is contrary to commonly-used adaptive techniques or techniques that do not make use of system parameters that need time to converge, leading to inaccurate estimates, possible packet losses, and tardy adjustments to workloads. Accordingly, these methods are not dynamic or efficient enough for wireless workload estimation.

Wireless workloads are estimated according to embodiments based on features including, but not limited to, system parameters, platform details, and implementation details. Non-limiting examples of system parameters include number of users, number of connections, quality requirements, and per-transmission unit MAP. In addition, non-limiting examples of implementation details include information about software architecture such as multithreading and pipelining.

Embodiments provide that the fine estimate is more accurate than the coarse estimate. In addition, embodiments also provide that the coarse estimate is determined earlier than the fine estimate. Furthermore, the fine estimate is obtained after the per-transmission unit MAP is computed in certain embodiments. According to certain embodiments, the estimated workload may be utilized for one or more of determining a scheduling policy on a shared computing platform, determining processing requirements dynamically in a grid or cloud environment, and performing admission control. The estimated workload may consist of processing done in various devices and control stations. Embodiments provide that the workload may consist of processing done in a wireless base station, access point, or user device. An embodiment may be configured where the workload estimation is used for managing IT resources in a cloud which is running one or more wireless applications.

Figure 6:
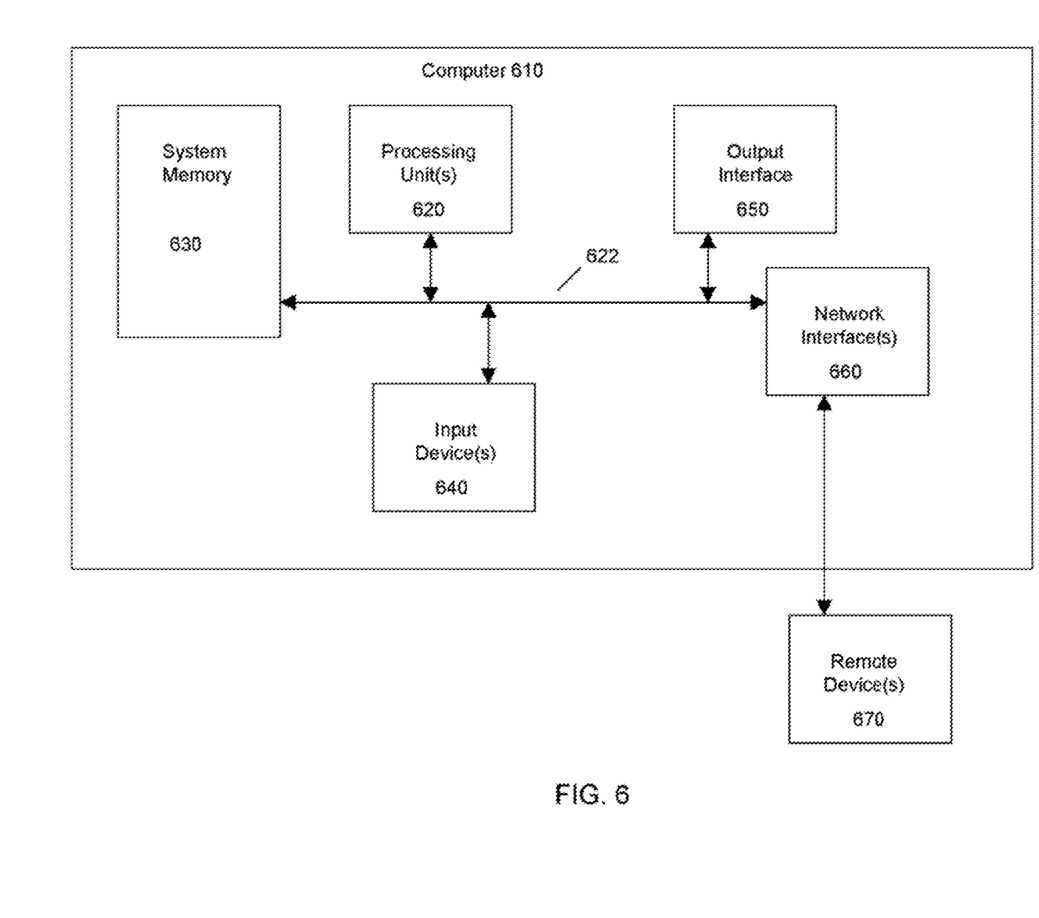
FIG. 6 illustrates an example computer system.

Referring to FIG. 6, it will be readily understood that certain embodiments can be implemented using any of a wide variety of devices or combinations of devices. An example device that may be used in implementing one or more embodiments includes a computing device in the form of a computer 610. Components of computer 610 may include, but are not limited to, a processing unit 620, a system memory 630, and a system bus 622 that couples various system components including the system memory 630 to the processing unit 620. The computer 610 may include or have access to a variety of computer readable media. The system memory 630 may include computer readable storage media in the form of volatile and/or nonvolatile memory such as read only memory (ROM) and/or random access memory (RAM). By way of example, and not limitation, system memory 630 may also include an operating system, application programs, other program modules, and program data.

A user can interface with (for example, enter commands and information) the computer 610 through input devices 640. A monitor or other type of device can also be connected to the system bus 622 via an interface, such as an output interface 650. In addition to a monitor, computers may also include other peripheral output devices. The computer 610 may operate in a networked or distributed environment using logical connections to one or more other remote computers or databases. The logical connections may include a network, such local area network (LAN) or a wide area network (WAN), but may also include other networks/buses, including telephony/voice channel connections.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising,
utilizing at least one processor to execute computer code configured to perform the steps of:
accessing at least one wireless workload produced on at least one wireless base station;
generating at least one requirements estimate of the at least one wireless workload, via generating at least one coarse estimate and at least one fine estimate;
wherein the at least one coarse estimate is based on a sum of:
a product of a number of users and at least one quantity relating to implementation-dependent complexities; and
a summation of quantities over a number of flow types supported by the at least one wireless base station; and
providing the at least one requirements estimate to at least one system function;
wherein the at least one system function operates to manage processing of the at least one wireless workload.

2. The method according to claim 1, wherein the at least one system function is comprised of scheduling policy, processing requirement determination, and admission control system functions.

3. The method according to claim 1, wherein the at least one base station is comprised of at least one of the following: WiFi access point, WiMax base station, 3G base station, femtocell, point-to-point wireless link, wireless device, and wireless cell phone tower.

4. The method according to claim 1, wherein the at least one base station is configured to communicate with at least one wireless device, the wireless device comprised of at least one of a laptop computer and a cell phone.

5. The method according to claim 1, wherein the at least one base station is integrated within at least one shared computing environment.

6. The method according to claim 5 wherein the at least one shared computing environment comprises a cloud computing environment.

7. The method according to claim 1, wherein generating the at least one requirements estimate of the at least one wireless workload is based on at least one of the following: at least one system parameter, at least one platform detail, and at least one implementation detail.

8. The method according to claim 7, wherein the at least one system parameter is selected from the group consisting of: number of connections, quality requirements, and details of the wireless standard-specific per-transmission unit MAP.

9. The method according to claim 7, wherein the at least one platform detail is selected from the group consisting of: operation/instruction per second information, instruction set architecture, and memory architecture.

10. The method according to claim 7, wherein the at least one implementation detail is comprised of at least one of the following software architecture characteristics: multithreading and pipelining.

11. The method according to claim 1, wherein generating at least one requirements estimate of the at least one wireless workload comprises generating at least one coarse estimate before generating at least one fine estimate.

12. The method according to claim 1, wherein
the summation comprises a quantity relating to a number of Cell IDs.

13. The method according to claim 12, wherein the summation comprises a summation, over the number of flow types supported by the at least one wireless base station, of products of:
   a quantity relating to a number of Cell IDs of a predetermined flow type; and
   at least one quantity relating to implementation-dependent complexities.

* * * * *